United States Patent [19]
Barrett

[11] 3,751,825
[45] Aug. 14, 1973

[54] TEACHING OR TRAINING AID SYSTEM

[76] Inventor: Jack H. Barrett, 861 Atlanta Ct., Claremont, Calif. 91711

[22] Filed: Mar. 2, 1971

[21] Appl. No.: 120,117

[52] U.S. Cl. ..................................................... 35/6
[51] Int. Cl. ........................................... G09b 13/00
[58] Field of Search ............................... 35/5, 6, 8 R

[56] References Cited
UNITED STATES PATENTS

| 3,080,661 | 3/1963 | Conrath ..................................... 35/6 |
| 3,414,985 | 12/1968 | Ashley ..................................... 35/6 X |
| 2,500,507 | 3/1950 | Avery et al. ............................... 35/5 |

*Primary Examiner*—Wm. H. Grieb
*Attorney*—Boniard I. Brown

[57] ABSTRACT

There is disclosed herein a teaching or training aid system wherein a display array of individual illuminated indicia-covered nacelles are disposed. Each of the nacelles can be illuminated individually or in any combination, or sequence, or at any rate or frequency in response to a pre-recorded training program to operate independently, or in synchronism with pre-recorded teacher's commentary. The pre-recorded material may be changed or the control data sequences may be changed at will, or the system may be operated by the teacher manually from a keyboard. Alternative means are provided so that a student can pace his own learning by controlling the system from a student keyboard corresponding in part to the teacher's control panel.

4 Claims, 11 Drawing Figures

PATENTED AUG 14 1973
3,751,825
SHEET 1 OF 5
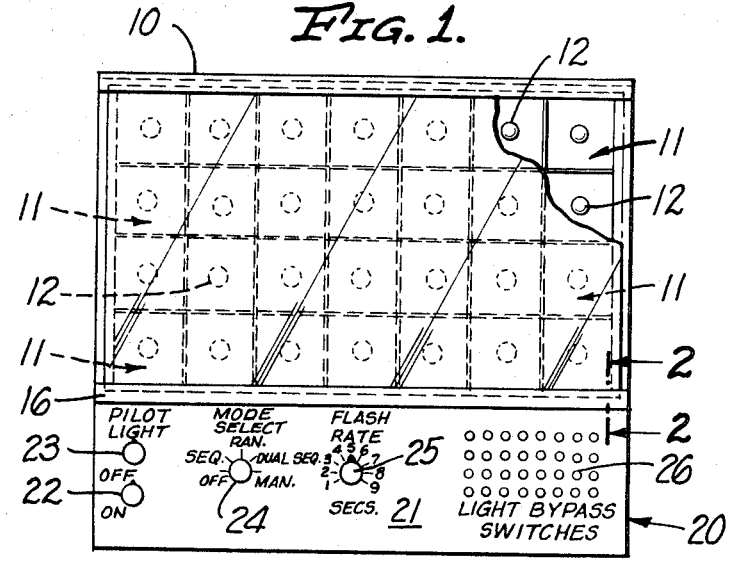
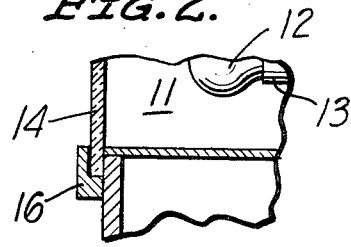
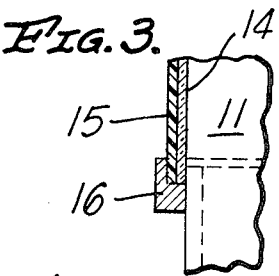
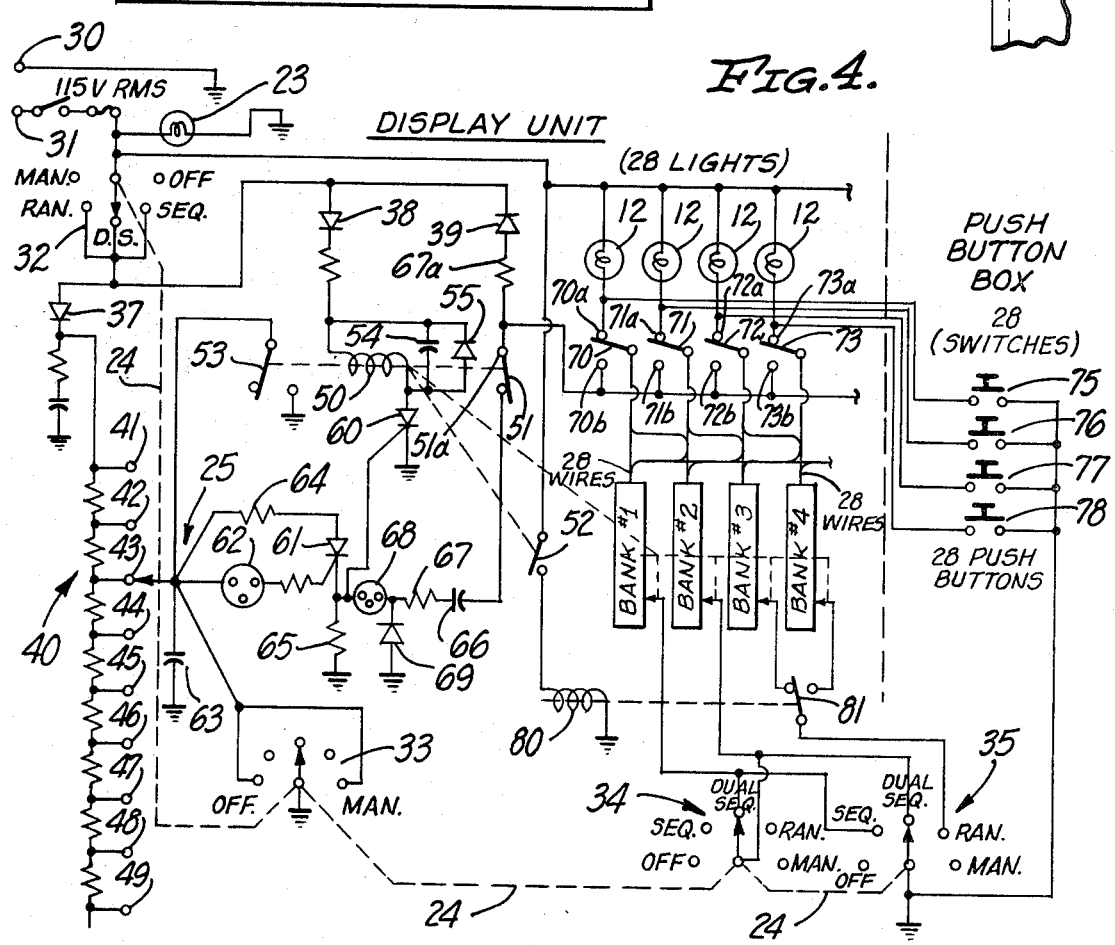
INVENTOR
JACK H. BARRETT
BY
Boniard I. Brown
ATTORNEY

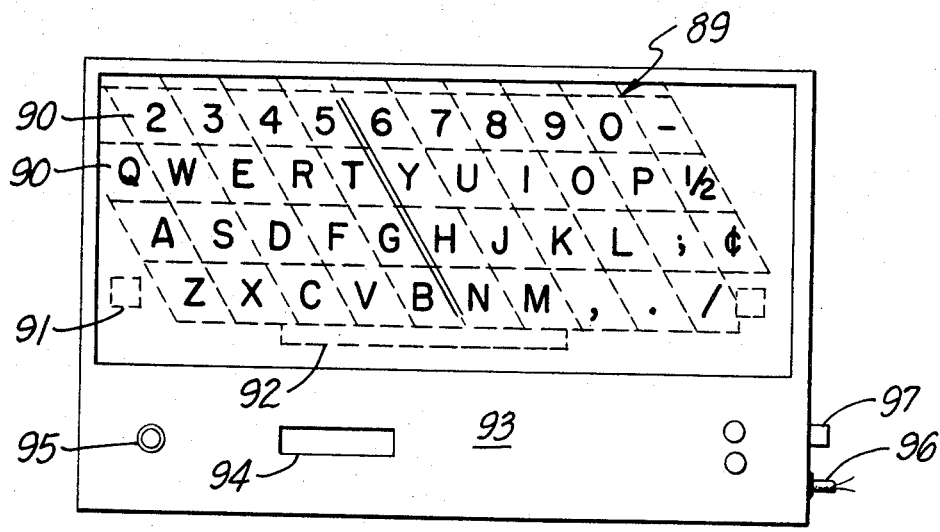
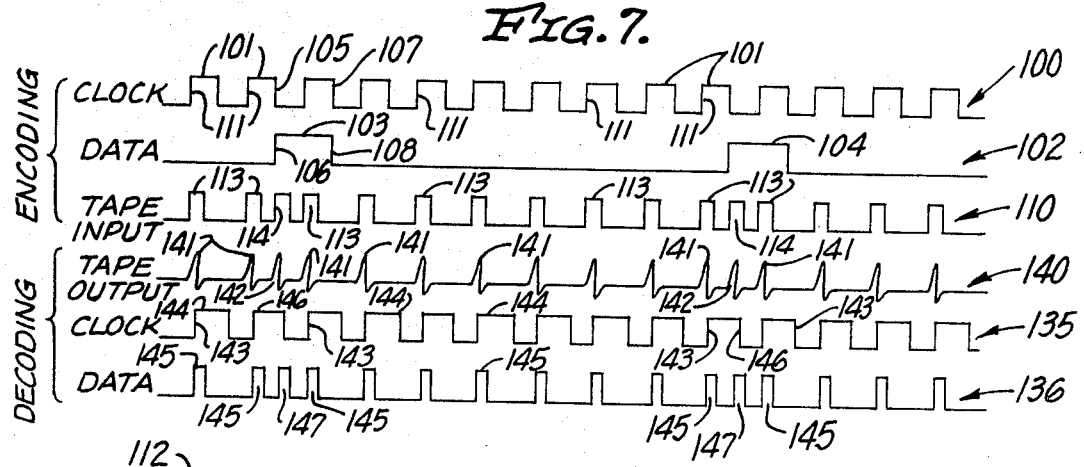
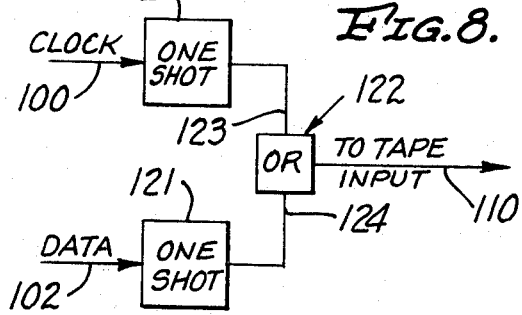
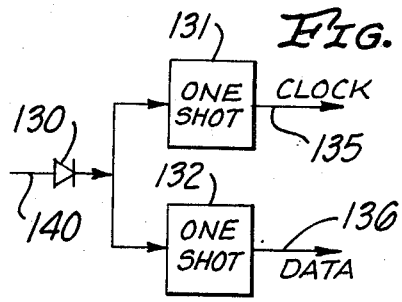

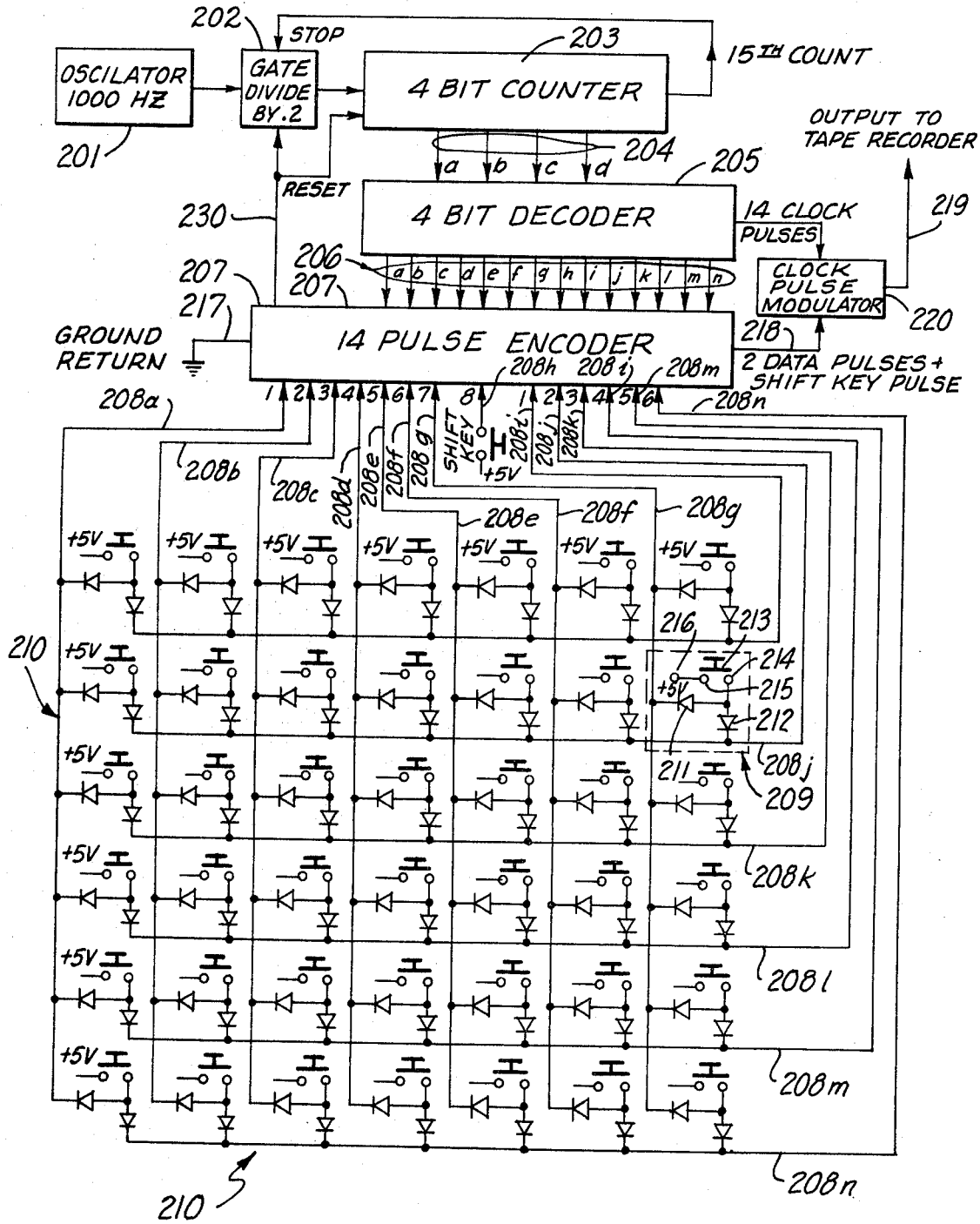

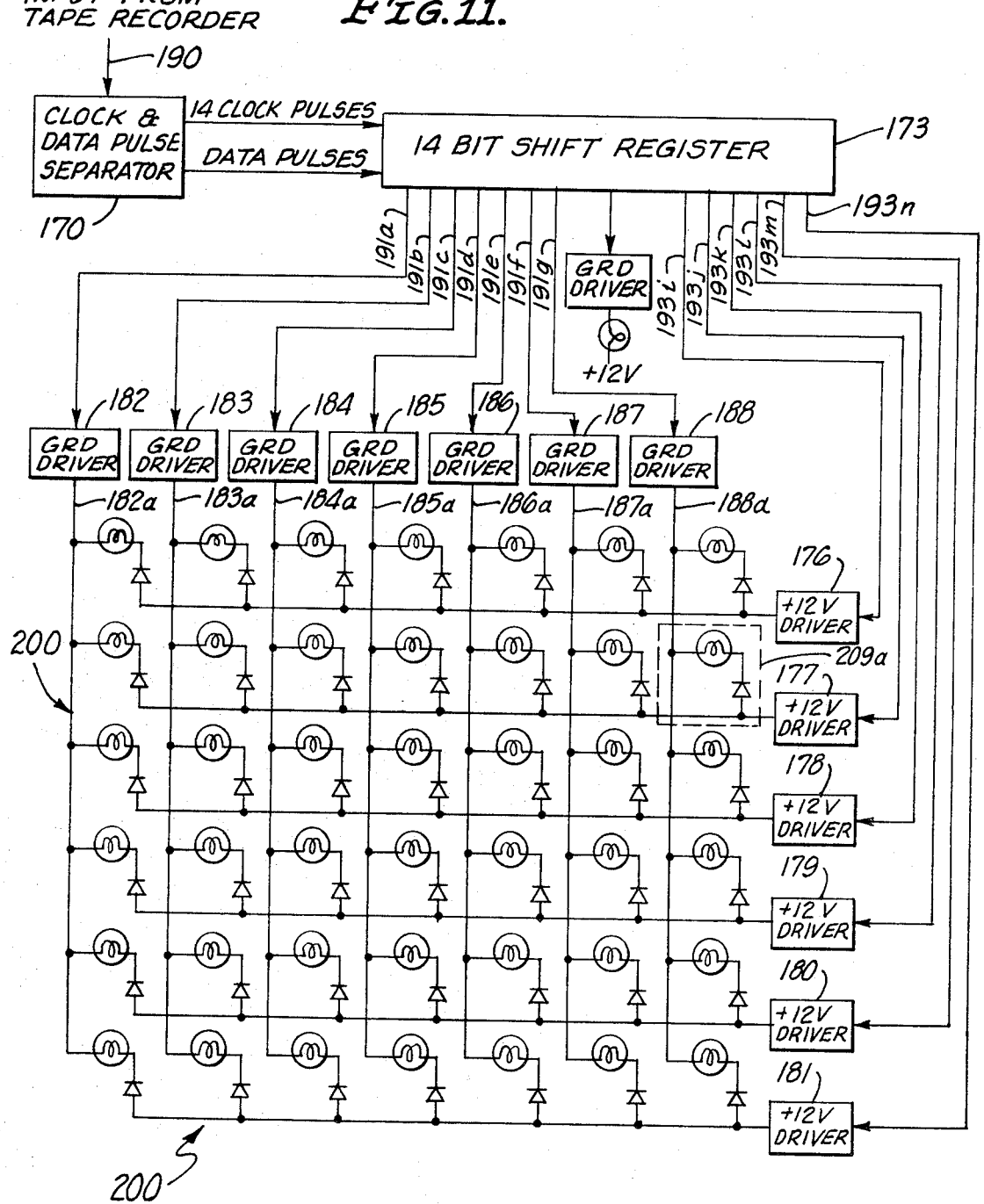

TEACHING OR TRAINING AID SYSTEM

BACKGROUND OF THE INVENTION

In any training situation whether applied to children or adults, the principle of conditioning is involved. Conditioning is a process wherein a stimulus requiring a particular response is presented to a learner repeatedly until the subject matter becomes an automatic part of the learner's behavior in the stimulus situation. Stimuli to human subjects can be visual, audible, tactual or such that any other senses are excited.

Combining visual and audible stimuli has been found by educators to be most effective. Thus, seeing a word and hearing its pronunciation, or sound is more effective than simply speaking the word. To learn to type a word, not only must learned language memory be involved, but there must also be training of mechanical operation of the fingers to press appropriate keys of the typewriter in getting the typed word on paper.

Children learning to read, young persons and adults learning to type, in fact anyone learning any skill can be aided in the learning process by audio-visual presentation of the stimuli of the subject material to be learned.

There have been a number of ways in which audio-visual (A-V) presentations have been made in the past. The first is the obvious "show and tell" technique where the teacher shows the image of the thing to be learned while she speaks it. A second way has been the use of pre-recorded sound of a teacher presenting material and an automatic means associated with the recording to present a related image. A third way has been the "language lab" technique where pre-recorded materials are associated with the printed page as a book or card to be followed by the student while he listens to the associated recorded material. There are many other techniques in use.

Images may be presented as still pictures (lantern slides and the like) or they may be a part of the system in permanent locations. Each separate image can be individually illuminated as desired. They can be illuminated in sequences of two or more images or in multiples simultaneously.

Any number of complex advertising display systems in large cities employ the sequences of illuminated images, lit-up alphanumeric characters, or rolling or moving image and character sequences as in the Times Square displays in New York City. There are many photo, identification displays at historical monuments such as Independence Hall in Philadelphia which use voice and images combined.

There have not been in the prior art, to this inventor's knowledge, combined, selectable illuminated image-display nacelles which can be sequenced and actuated by a tape-recorded train of signals operated in synchronism with a voice commentary. There are sound-slide programmers employing cue-signals synchronized with voice commentary, however. There are also digital signal sequences recorded on magnetic tape along with commentary for the tripping of slide projectors and other apparatus. None of these have been applied to the learning situation as in this invention.

BRIEF SUMMARY OF THE INVENTION

This invention relates to a classroom training display system for aiding the teaching of various subjects.

The display consists of any array of illuminable areas each of which can be illuminated on command.

The commands can be from a keyboard operated by the teacher or by an electromechanical stepping or sequencing means, or from a pre-recorded magnetic tape program.

The tape program can be recorded on an ordinary commercial audio tape record/playback system of the domestic consumer type or on professional recording apparatus normally associated with radio, television, or sound recording studios.

For example, in the teaching of typewriting skills, the display array can consist of illuminated keyboard elements each disposed in a position corresponding to its location on a typewriter keyboard. For math instruction, each of the illuminated areas can be a mathematical or arithmetic symbol, or sum, or product or difference or quotient as the case may be. Similarly, the displays can be used for other subjects.

The programs, by which the training displays are illuminated in sequence, can be developed for rapid drill use, or slowly for initial instruction. They may be appropriately recorded for use in examining classes in the subject material of the display.

According to the invention, for whatever subject matter may be involved, the display unit is a cell including a lamp over which a translucent plate may be placed. The shape of the cell may be circular or rectangular or of any other configuration. The translucent plate will have printed or painted indicia relating to a particular subject area such as typewriter key designations or mathematical symbols or pictograms, or the like. Each lamp is connected in an electric matrix assembly such that a particular lamp may be excited when current is applied to the appropriate address points for that lamp in the matrix. Alternatively, the lamp may be a load device in a switched transistor circuit to be illuminated when that transistor is biased on by an appropriate signal, or when selected by a multi-contact stepping switch.

The indicia plates in front of the lamps may be changed readily.

The switching signals which are applied to the matrix control or the transistors, as above described, can be digital (binary coded) signals of the characteristic pulse configuration of such signals or they can be audio signals pulsed on and off in accordance with the prearranged program by which the teaching function is being presented. A plurality of such signals can be generated and coded to be presented in appropriate sequences to be recorded on magnetic tapes in the conventional fashion and played back to a decoding mechanism incorporating the above-described matrixing or transistor switching system to excite the lamps illuminating the teaching materials in the display.

The teacher, or the student, or a multi-contact step switch circuit, or a pre-recorded magnetic tape program may be the medium for presenting the training sequences.

The apparatus used is conventional, but employed in novel combinations which make the system economical in its use and flexible for such applications as may be desired in any training situation of large or small groups.

In the specification which follows and in the drawings, preferred embodiments of the invention are disclosed. These embodiments should not be construed to

BRIEF DESCRIPTION OF THE DRAWINGS

FIG. 1 is a front elevational view of a front panel showing a representative indicia display array and control panel of apparatus according to the invention;

FIG. 2 is a cross-sectional partial detail through 2—2 of FIG. 1, showing a typical indicia nacelle, part of the panel in FIG. 1;

FIG. 3 is an alternative detail like FIG. 2 showing the separate indicia panels to be inserted in the nacelles according to the invention;

FIG. 4 is a circuit diagram of the system of this invention showing control means for illuminating the lamp in appropriate sequences or combinations using a multi-contact electromechanical stepping switch:

FIG. 6 is a typical display panel like that of FIG. 1, arranged for teaching secretarial skills such as typewriting;

FIG. 7 is a wave form diagram sequence showing the signal data for producing automatic tape recorded control of the teaching program according to the invention;

FIG. 8 is a block diagram of a typical data recording input or encoding technique for the invention;

FIG. 9 is a block diagram of a typical data detection or decoding technique for receiving control data from a recording or other signal source for the use of the invention;

FIG. 10 is a detailed block diagram of an embodiment of a system for generating a coded program according to the invention which may be recorded on magnetic tape; and FIG. 11 is a detailed block diagram of an embodiment of an operating control system for operating the display panel according to the invention from recorded control data material as recorded by the system shown in FIG. 10.

DESCRIPTION OF THE PREFERRED EMBODIMENT

Figure 5:
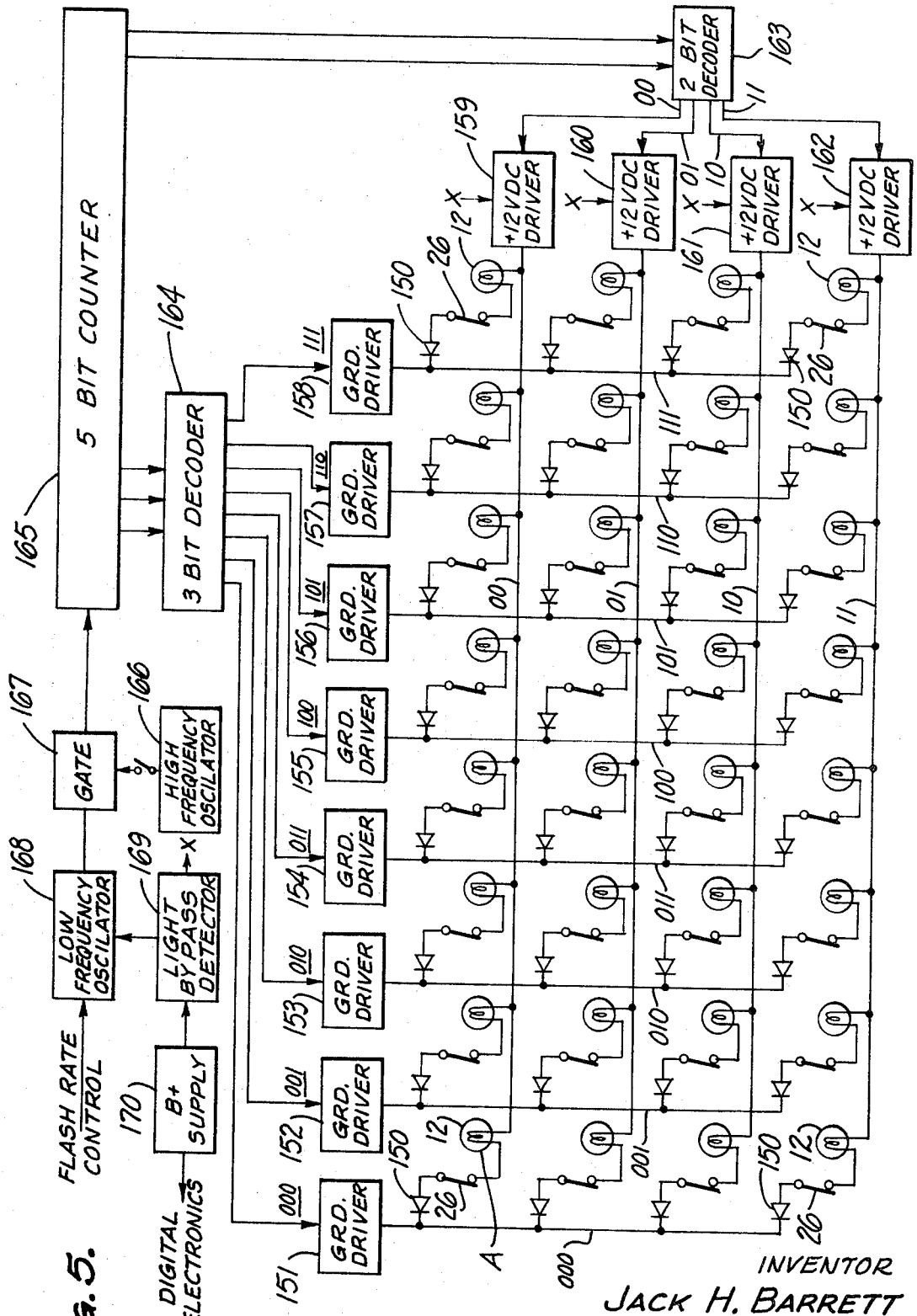
FIG. 5 is a detailed circuit diagram showing digital means for automatically illuminating the lamp to be used in the application of the invention.

The invention may be considered to have three forms of implementation. These can be described as (A) electromechanical; (B) digital subject to fixed programming and (C) digital with infinitely variable programming means, for example, using a tape recording or other medium for providing the program. In all of these forms an indicia display can be actuated by the electromechanical or digital means.

In FIG. 1 a typical indicia display panel according to this invention is shown. It consists of a frame 10, and base 20 within which a representative array of 28 lamp nacelles, such as at 11 is disposed. The nacelles 11 are shown herein in rectangular configuration. They may, however, have any shape such as circular, or otherwise. In each compartment, or necelle 11, is disposed a lamp 12 in an appropriate socket 13. The lamp 12 and socket 13 are shown in partially cut away cross-sectional drawing of FIG. 2 taken through 2—2 of FIG. 1. In FIG. 2 a translucent plate 14 is shown covering nacelle 11. Plate 14 may be one of such dimensions that an entire lateral row in the exemplary 4 × 7 array of 28 nacelles 11 is covered and there are indicia printed or painted thereon such that each such indicium appears over a particular one of the nacelles to be illuminated when the respective lamp such as 12 therein is lit up. Or, all 28 nacelles may be covered by one translucent sheet with symbol attached. A specially treated sheet of plastic may be inserted in front of the translucent sheet so that symbols are invisible until illuminated. The 4 × 7 array configuration is merely illustrative. There may be any other configuration or number of nacelles to suit the needs of the user.

As an alternative, as may be seen in FIG. 3, each nacelle 11 may have an individual external sheet such as 15 with the desired indicium thereon. The translucent cover plate 14 and indicia plate are supported in a rabbeted ledge as shown at 16.

In base 20 is disposed a panel 21 on which is installed all of the electrical selection and switching gear of the invention. These include an on-off switch 22, a pilot lamp 23, a mode selection switch 24, a flash rate switch 25, and an array of 28 light bypass switches 26. Indicia may be selected manually by a separate panel of switches on a box connected by a cord to the panel 21.

In the case of the electromechanical unit (containing step switches) and the non-programable digital unit (not used with tape recording) there are light bypass switches used to cause symbols to be bypassed which are not ready for presentation or that have been sufficiently mastered. Manual selection is accomplished with a separate push button box which may be plugged into the main unit. Alternately remote manual selection can be accomplished using an RF link between the main unit and the push button box in conjunction with the infinitely variable digital unit described below. In the case of the preprogrammed digital unit employing tape recorded control signals, bypass switches are not needed.

In FIG. 4 the electromechanical step switch circuit diagram is shown for operation of the equipment illustrated in FIGS. 1–3. Across a 115V A.C. input 30, 31 the pilot lamp 23 is connected to indicate that power is applied to the system. From the "hot" side 31, one deck 32 of the selector switch 24 (see FIG. 1) is connected so as to apply power to the automatic light selection system in the SEQ, RAN, and DUAL SEQ operational modes of the system as hereinafter described. As can be seen, no power is applied to the automatically operated selected circuitry in the OFF, or MAN positions of switch deck 32 of switch 24. (In FIG. 4 the mechanical linkage between the several decks 32, 33, 34, 35 of the switch 24 is identified with numeral 24.)

Rectifiers 37, 38, 39 and 69 convert the A.C. line power derived from input 30, 31 to half wave rectified D.C. for use by the system in the conventional manner as described below. Rectifier 37 powers a resistive voltage divider network 40 with taps 41–49 thereon. A switch 25 selects one of taps 41–49 for control of the flash rate as hereinafter described.

Rectifier 38 provides D.C. for step switch relay coil 50 and SCR 60 to operate the associated contact assemblies 51, 52, 53 of relay 50 and stepping switch banks No. 1, No. 2, No. 3 and No. 4. Rectifier 38 also prevents breakdown of SCR 60 due to excessive current flow during the negative half cycle of the line current. Diode 55 is connected across relay coil 50 to "despike" the coil, that is, eliminate transients that might damage the SCR 60. Capacitor 54 across coil 50 is of a large enough value to hold a charge sufficient to maintain relay coil 50 energized through a complete step of the step switch even though SCR 60 may become deenergized before the step is complete.

An SCR 61 is operated to fire each time neon lamp 62 is fired, at a level determined by the firing level of neon lamp 62, and at a rate determined by the setting of switch 25 on one of taps 41–49 of divider 40.

The tripping rate of SCR 61 is a function of the value of resistance 40 selected at taps 41–49 and capacitor 63 operating with neon lamp 62 as a relaxation oscillator. Neon lamp 62 is coupled to the gate of SCR 61. Resistors 64 and 65 are current limiting resistors for SCR 61. Resistor 65 also functions as the gate return resistor for relay control SCR 60. The drop across resistor 65 trips SCR 60 on when SCR 61 is turned on each cycle of operation of the relaxation oscillator 62, 40, 63, 53. Contact 53 of relay 50 acts to turn off SCR's 60/61 and completely discharge capacitor 63 at the end of each relaxation oscillator cycle, since SCR's must be extinguished by removing power or by short-circuiting once turned on. In this case SCR 60 turns off as soon as the gating pulse ends since SCR 60 is passing half wave rectified energy (it would not extinguish at the end of the gate pulse if relay power was D.C.).

Contact 51 is required for fast stepping switch operation which is independent of the relaxation oscillator in order to quickly step past step switch bank contacts in which the light is bypassed by one of the bypass switches.

Referring further to FIG. 4, in normal operation with bypass switches 70–73 (representative of a total of 28 such switches) in the position shown at 70a–73a a different lamp is selected each time one of step switches such as bank No. 1–4 is stepped. The lamps 12 will be selected sequentially by bank No. 1 if mode switch 24 is on the SEQ position. Two adjacent lamps 12 at a time will be selected sequentially by bank No. 1 and No. 2 if mode switch 24 is on the DUAL SEQ position. The lamps 12 will operate in a semi-random sequence if mode switch 24 is in the RAN position and lights are selected by banks No. 3 or No. 4.

Banks No. 3 and No. 4 may be set for different sequence groupings of lamps respectively. At the conclusion of the stepping cycle of bank No. 3, the alternate normal contact 52 on the stepping switch 50 energizes relay 80 which operates switch 81 to select bank No. 4 into operation. The result is a longer semi-random sequence at lights. This connection technique is well known in the stepping switch art.

When the selected step switch bank encounters a bypassed light (one of the switches 70 is down) a ground is provided to the step switch bypass circuit causing the step switch to immediately step to the next bank contact.

The step switch is pulsed by a negative charge placed on capacitor 66 during the negative half cycle of the A.C. power which is applied through diodes 39, 69 and resistors 67 and 67a.

Therefore, any time the armature contact terminal 51a is grounded as through any one or more of bypass switches 70–73, as when the selection of a step switch of banks No. 1–No. 4 contacts the loads of a bypassed lamp, the capacitor 66 discharges through neon lamp 68 pulsing SCR 60 on. The normally closed contacts 51 are necessary so that a light bypass current pulse will not occur while the step switch relay coil 50 is energized by the relaxation oscillator 62, 40, 63, 53. This is the case whenever a closed light bypass switch is encountered by the step switch banks, providing a ground through switches 70b–73b, etc., to the negative side of capacitor 66.

Without the normally closed contact 51, the current pulse would merely reinforce the relaxation oscillator pulse and the step switch would not step beyond the bypassed lamp circuit reached on the step switch.

Since normally closed contact 51 is opened, the instant coil 50 (for the step switch) is energized by the ground connection through contacts 51, coil 50 no longer has sufficient energy to make a full step beyond the bypassed lamp position. Thus, a large value capacitor 54 across coil 50 becomes charged on energizing of coil 50 and discharges relatively slowly through coil 50 supplying it with sufficient energy to complete the step despite the fact the contacts 51 open immediately when coil 50 is energized. If capacitor 54 were not used, relay coil 50 would chatter without stepping in response to the ground provided by a bypassed light switch.

At slow rates of oscillation of relaxation oscillator 62, 40, 63, 53, with capacitor 54 across coil 50, the current pulse from capacitor 63 through neon lamp 62 to SCR 60 is not strong enough or will not last long enough to step coil 50. Therefore, the second SCR 61 is necessary to "amplify" the relaxation oscillator pulse from neon lamp 62 in order to trigger SCR 60 for a sufficient length of time.

In the "a" positions of switches 70–73, stepper banks No. 1–No. 4 activate lamps 12 to illuminate them in accordance with a particular sequence or program.

Relay 80 is operated by contacts 52 of relay coil 50 once every cycle of the stepping switch (these are called alternate normal contacts) to switch its contacts 81 between banks No. 3 and No. 4 so that when the mode selection switch deck 35 is in the RAN position, the selection sequence alternates between banks No. 3 and No. 4 once every cycle.

The above description encompassed the electromechanical step switch operation of the invention. The following is a description of the digital subject to fixed programming implementation of the system.

In FIG. 5 is shown the circuit diagram partially in schematic form and partially in block form for digital operation of a fixed programming drive system for the array of 32 lamps 12. Each lamp 12 is connected in series with a switch 26 and a steering diode 150. The matrix connection of each lamp 12, switch 26 and diode 150 is between a positive 12-volt driver line such as 159–162 and a ground driver line such as 151–158 so that as long as any switch 26 is closed, the lamp 12 connected to it will be energized when the +12 volt driver line and ground driver line are energized through the gating "on" of respective drivers from the 3-bit decoder 164 and 2-bit decoder 163, providing appropriate "on" gating pulses. In the following discussion binary identifications are used for the driver and ground lines to correspond to their digital binary count values. For example, lamp 12 marked A will be lit when the ground driver 151 in line 000 and +12 volt driver 159 on line 00 are energized if switch "a" is closed. Similarly lamp B will light if switch "b" is closed and ground driver 153 in line 010 and +12 volt driver 160 on line 01 are energized. Also, if lines 100 and 10 energize ground driver 155 abd +12 volt driver 161 lamp C will light, if switch "c" is closed. Also, lamp D will light if the 110 and 11 lines similarly energize drivers 157 and 162 in their respective lines. From the above, one can see that any lamp unit 12 or combination will be illuminated upon appropriate bits being applied unless switch 26 associated with it is open. When any switch 26 is open, the associated lamp 12 is bypassed.

By presetting appropriate or desired combinations of the switches 26, for example the selected "a", "b", "c" and "d" switches referred to above, the selected lamps 12 identified as A, B, C, and D can be made to flash on as the appropriate digital counts from 5-bit counter 165 are detected by decoders 164 and 163, to gate the lamps on as hereinabove described.

Counter 165 is gated through its counting sequence by the outputs of either high frequency oscillator 166 or low frequency oscillator 168. If any one of switches 26 is open as the counts reach the matrix position of the open switch, the associated lamp will not light.

Thus, the lamp array can be preset by manual setting of switches 26 so that the lamps selected by the switches 26 are illuminated at a slow or fast rate. The lamps for which the switch 26 completes their circuits are lighted and the others are not.

The B+ supply box 170 in FIG. 5 contains level sensing means responsive to the changes in current resulting when a lamp lights or does nor light at the time of an appropriate binary count. When a lamp lights, the resulting voltage drop during a count sequence has no effect, but should the bypass switches 26 be open at any selected point when the counts arrive at that point, the absence of a voltage drop causes the counters to step to the next count higher immediately, irrespective of whether the slow or fast pulsing rates of oscillators 168 or 166 are being operated.

During sequential light operation, the high frequency oscillator is not used. A low frequency relaxation oscillator, whose frequency is controlled by varying the resistance of a charging circuit, provides low frequency short duration count pulses to the counter.

To achieve a random light sequence at the frequency provided by the low frequency oscillator, the low frequency pulses are used to open a gate allowing the counter to count the high frequency oscillator output. The counter fills up and recounts the high frequency oscillator output several times during the short duration pulse of the low frequency oscillator. At the end of the low frequency oscillator pulse, the counter will stop wherever it is and hold the count until the next low frequency oscillator pulse. In this way, a random light selection sequence is obtained.

The above description encompassed the digital subject to fixed programming implementation of the system. The following is a description of the digital with infinitely variable programming implementation of the system employing tape recording means.

In FIG. 6 there is shown a nacelle array 89 arranged in a form and disposition representative of the location of typewriter keys. The nacelles are each covered with a character identification as at 90 where numeral 2 and letter Q are indicated. Additional nacelles for "shift" key and "space bar" are provided as at 91, 92.

In the base 93 of the nacelle array 89 is provided a tape recording system with a slot 94 to receive a magnetic tape cartridge, a volume control 95 and switch and outlet terminals 96, 97. The tape recording device here shown is merely illustrative since any cartridge, cassette or reel-to-reel tape recorder may be used as desired by the user of the invention. The outlet terminal 97 would normally be connected to a loudspeaker for a large class or to single sets of earphones for individual instruction or a large group of earphones for general class use to avoid typewriter noises disturbing the class. The stereo tape recording system in base 93 is conventional in its construction.

It should be obvious to those skilled in the art that the same functions as performed by the electromechanical system of FIG. 4 can be actuated by digital means as in FIG. 11 or combined with tape recorded signal driving means of known design, so that an instructor can have the option of operating normally via the selector switch 24 (FIG. 4) or from a tape recorded signal control program operating the relay coil and steppers or the bypass switches.

The individual lamps behind each nacelle in array 89 of FIG. 6 can be operated in the same manner as those described above in the discussion of FIGS. 1–3 inclusive and can be manipulated by switching means such as shown in FIG. 4. However, a preferable means of operating the lights of the array of FIG. 6 is by the tape recording system 93 as further detailed below.

To understand the tape recording technique, reference should be made to the wave form diagrams in FIG. 7. These wave forms are in vertical alignment so as to represent the sequence of occurrence of waves related to one another.

In row 100 of FIG. 7 there is shown a train of uniformly spaced clock pulses 101. Such pulse trains can be generated by many means known in the electronics arts such as "flip-flop" oscillators and the like.

In row 102 a data pulse train is shown with representative data "bits" 103 and 104 thereon. It should be noted that a data bit is initiated on the fall of a clock pulse as indicated at 105 and 106 and terminated at the fall of a next succeeding clock pulse as indicated at 107, 108.

The process of encoding a data pulse is accomplished by conventional means by the enabling of a single pulse generator by a switch. Such an enabling action can be by the operation of one of 45 push-button switches connected in a diode-switch matrix. The data pulse occurs on the fall of the clock pulse corresponding to position of the closed push-button switch. Pulse trains may be applied externally through plug 96 directly from an external encoder box containing such switches or indirectly from a tape recorder which was programmed using the encoder box.

The wave train generated by the encoder box shown at 110 is that achieved by the combined action of clock pulse train 100 and data pulse train 102. pulse train 110 is generated by the gating mechanism shown in FIG. 8 and should be considered with reference to FIG. 8 for the ensuing discussion.

The occurrence of the rise 111 of each clock pulse such as 101 applied to one-shot multivibrator 112 at 100 initiates the turn-on of one-shot 112 for a predetermiend duration less than one-half clock pulse duration as indicated at 113 in wave train 110.

The occurrence of a data pulse 103 applied at 102 to a one-shot 121 as shown in FIG. 8 results in the operation of one-shot 121 being turned on for predetermined interval corresponding in duration to that of one-shot 112. Since one-shot 112 is started on a rise 111 of clock pulse 101 and one-shot 121 is started on a fall 105 of clock pulse 101, at any time the occurrence of a data pulse 114, when present, will be in a time period between the occurrence of a successive pair of clock pulses 113 as indicated in pulse train 110.

Putting pulse trains directly on magnetic tapes as with conventional tape sound recordings is a new departure in recording. In the prior art, deviation of the frequency of an oscillator in discrete amounts and recording the resulting sinewave has been widely used in the more expensive commercial recorders. The attendant problems involved in recovering digital pulse trains from low cost tape recorders directly, although inexpensive, has resulted in the carrier frequency approach mentioned above.

The OR gate 122 has two inputs 123, 124 connected respectively to the outputs of one-shot multivibrators 112 and 121 respectively. The output of OR gate 122 is the wave train 110 previously described. This wave form may be recorded directly on magnetic tape in a novel manner or may be used to gate on oscillator. The gated oscillations which correspond to wave train 110, are then recorded, or, more properly, encoded on the tape.

The recorded wave train 110 may be decoded on playback of the magnetic tape by its detection via the circuit shown in FIG. 9.

A diode 130 as shown in FIG. 9 receives the recorded wave train 140 shown in FIG. 7 and acts as a threshold device to eliminate noise as well as a rectifier. Recorded wave train 140 corresponds in pulse sequence to wave form 110. Each pulse in train 140 is applied via diode 130 to one-shot multivibrators 131 and 132.

The one-shot 131 is timed to turn on for one-half the interval between successive clock pulses 141 each time a pulse 141 occurs. This is shown in wave form 135. If a second pulse such as 142 occurs during this interval, it will not initiate a second pulse in the train 135 from one-shot 131. One-shot 132 is timed to produce a short duration pulse for each pulse in pulse train 140 as shown in pulse train 136. Pulse trains 135 and 136 are then compared and each time a pulse is present in pulse train 136 when a clock pulse in wave train 135 is falling, a data pulse will be clocked into a shift register.

In FIG. 10, a block diagram is shown with certain circuit elements therein by which a coded signal can be encoded for recording or taped for use with the invention. A source of pulse data is 1,000 HZ oscillator 201. Gate circuit 202 divides the 1,000 HZ signal by two so that a 500 pulse per second input is provided to 4-bit counter 203 capable of making 16 counts. At the fifteenth count, a stop signal is applied to gate 1 divider 202 so that no further counting pulses are applied to counter 203 until a new starting pulse has been applied. All of the count condition outputs 204 a-d of 4-bit counter 203 are applied to a 4-bit decoder 205 as an input signal. From 4-bit decoder 205, 14 outputs 206 a-n are provided in time sequence. Each of the 14 outputs is applied to 14 pulse encoder 207. Pulse encoder 207 is in fact a comparator which provides an output every time there is a coincidence between one of the 14 outputs 206 a-n and one of the inputs 208 a-n. Inputs 208a through 208g represent the seven selector signal outputs from the seven vertical outputs of a matrix indicated generally as 210. These seven outputs provide a group of seven code signal selectors, while the six inputs 208 i through 208 n provide six horizontal outputs from matrix 210 as inputs to 14 pulse encoder 207. Input 208h is a separate shift-key input to encoder 207 and will generate a single data pulse which is independent of the row and column matrix pulses.

It may be seen from the above that matrix 210 is a 6 × 7 entity providing 42 output combinations of one of the vertical outputs 208a-g and one of the horizontal outputs 208i-n.

The matrix 210 includes switching elements which can be considered switching cells, such as outlined in dashed-in unit 209 which provides output combination 208j (horizontal) and 208g (vertical). Within each cell are a pair of diodes 211, 212, a push-button switch 213 with one contact 214 connected to the series junction of diodes 211, 212 and contact 215 connected to a source of positive D.C. potential of five volts at 216. The ground return for the 5 volt source is shown at 217 in the encoder 207 block. Whenever switch 213 of any cell such as 209 is closed shorting terminals 215 and 214, 5 volts D.C. is conducted from terminal 216 through the appropriate pair of matrix lines via appropriately poled diodes 211 and 212 through comparator encoder 207 to ground at 217, e.g., along lines 208g and 208j in the exemplary cell 209. The vertical lines 208 a-g can be considered columns and the horizontal lines 208 i-n can be considered rows.

The 1,000 HZ oscillator 201 produces what might be called clock pulses which after division to 500 HZ ripple through 4-bit counter 203 providing 14 counts to 4-bit decoder 205 via the output lines 204 a-d. From decoder 205, 14 clock pulses are applied to clock pulse modulator 220. The fifteenth count returns to the gate and divide by two unit 202 to stop the count.

Now decoder 205 sequentially has an output on each of its output lines 206 a-n. Since the switch 213 on any cell like exemplary cell 209 is closed, a column line (here 208g) and a row line (here 208j) will each provide a coincidence bit to clock pulse modulator 220 via encoder 207. A reset pulse is applied on line 230 from encoder 207 to counter 203 each time a switch like 213 is closed.

The output at 219 of modulator 220 then appears like pulse train 110 of FIG. 7 to be applied to a tape recorder for encoding by recording it on a magnetic tape channel. In pulse train 110, the data pulses 114 correspond to clock pulses derived from encoder 207 on data pulse line 218, and result from pressing button 213 or a corresponding one in any other of the 42 cells like cell 209, shown in FIG. 10.

Shift key button 208h provides a data pulse corresponding with clock pulse 14 which also appears on the 4-bit decoder output line 206n. The shift key pulse appears as an additional pulse to the row and column data pulses appearing on the encoder output line 218. Three data pulses are generated on line 218 when a symbol key is depressed at the same time the shift key is depressed.

In FIG. 11 there is shown the block diagram with some circuit elements of a mechanism for producing an indicia display in response to the recorded signals made by the matrix and encoder described in FIG. 10.

When a signal as generated by the system described in FIG. 10 has been recorded on a magnetic tape, it can be retrieved therefrom on playback of the magnetic tape recorder into input 190 of clock and data pulse separator 170 of FIG. 11. The clock and data pulse trains (135 and 136 in FIG. 7) obtained from the clock and data pulse separator (FIG. 9) are applied to 14-bit shift register 173. From shift register 173, one of seven outputs 191 a–g for the vertical columns of matrix 200 of FIG. 11, and one of six outputs 193i through n for the horizontal rows of the matrix are generated for each detected pulse train group. A third data pulse may also be generated for the shift key.

For this discussion, assume the signal recorded from the encoder 207 of FIG. 10 was from the cell 209 with data bits on lines g and j. The signal entered into shift register 173 would therefore be that which would drive lines 191g and 193j to excite lamp 12 in dashed-in box 209a because lines 191g and 193j enable ground driver 188 and 12-volt driver 177 to complete the circuit through diode 150 and lamp 12 in cell 209a in matrix 200, lighting the lamp. Thus, the encoded signal from cell 209 in FIG. 10 and recorded on a tape when played back excites a lamp in cell 209a in FIG. 11. Note that the position of cell 209 in matrix 210 of FIG. 10 corresponds to the position of cell 209a in matrix 200 of FIG. 11.

Similarly, recordings of signals corresponding to the data from any one of the 42 cells in FIG. 10 (matrix 210) can be recorded and on playback excite the lamp in the corresponding cell of matrix 200 in FIG. 11.

It should be remembered here that any of the matrix cell lamps 12 of FIG. 11 correspond to the lamps in the nacelles of FIGS. 1 or 6. It should also be noted here that recording of the signals as in FIG. 11 is accomplished when one of the matrix selector buttons, as shown in FIG. 1, is depressed while the tape recorder is running it its record mode of operation.

There has been described hereinabove a new teaching or training aid system where a teacher in a classroom can by the operation of a keyboard or push button box in conjunction with selector switches such as panel 21 shown in FIG. 1 make selection of indicia material to be display be eliminated from a display of indicia nacelles such as at 1 in FIG. 1. These indicia nacelles may contain symbols or figures or alphanumeric characters or words to be made part of a training situation. The display of the material can be programmed in one mode of operation by an electromechanical stepping switch following the presetting manually of the desired display items in the display array. As an alternative, the display may be programmed as described in connection with FIG. 5 by a digital program preset so that the excitation of the display follows the preset program. A third mode of operation as hereinabove described, encompasses the making of records on a magnetic tape reel or cartridge incorporating the desired order and sequence of display items to be presented (that is, letup in the display array).

The records are of digital signals created in accordance with wave forms generated in response to key selection means related to the particular position of a display item desired at that point in the program. These signals for the digital program can be recorded on one track of a stereo or two track recording with the second track containing teacher commentary or other instructional material so as to present a lesson in synchronism with the changing display items in the array. An example of this might be illuminating individual key symbols of a typewriter keyboard diagram for typewriter training with voice call outs on one track and the digital program signals on the other track for the actuation of illustrative typewriter key indicia corresponding to the voice call outs and in synchronism therewith. Means have been described as in FIG. 10 and 11 for both the making of the recording for the digital program and its playback to operate the display automatically from the recorded information.

From the preceding description, it should be clear to those skilled in the arts appertaining to this invention that there will be many variations that can be derived within the framework of what has been described for the preparation of automatic or auxiliary teaching aids incorporating the means and principles hereinabove disclosed.

The inventor claims:

1. A teaching aid comprising:
a display array of illuminable indicia, each indicium being of a character to indicate a unit to be learned;
lamp means behind each indicium for illuminating said indicium;
switch means connected with said lamp means for selecting respective ones of said display array of indicia to be illuminated;
said switch means including a stepping switch selectively connectable to said lamp means to illuminate selected ones of indicia;
periodic control means connected to said switch means for operating the respective selected lamp means in accordance with the periodicity of said control means; and
said periodic control means including a relaxation oscillator to control the period of operation of said switch means and the stepping rate of said stepping switches.

2. The teaching aid defined in claim 1 wherein:
said switch means includes a selection switch connected for selection of one of a plurality of modes of operation of said teaching aid by respective connections between said stepping switches, and
manually operative switches connected to said lamps so that a teacher may select the lamp to be illuminated, or by-passed in accordance with a particular training program.

3. A teaching aid for selectively displaying indicia of units to be learned in a random or sequential program, said aid comprising:
a switching matrix array including rows and columns of connections and of matrix elements, each element comprising a steering diode, a normally closed switch and a lamp connected in series between a row and a column and being normally actuatable by the presence of a d-c potential thereacross of a polarity conductable across said diode;
said matrix being selectively operable in a sequential and in a random mode, said lamps forming a display array in which individual lamps may be made inoperative by manually opening said switch series connected therewith;
row and column drivers connected to said rows and columns of said matrix array for on a d-c d-c potential between said rows and columns;
a digital control system including a counter with decoder outputs connected to said row and column drivers in said switching matrix for actuating said lamps in a predetermined sequential or random order when a row and column drivers are gated on; and
pulse generators connected to said counter and including selective means for providing non-uniform low frequency or high frequency pulses to said counter for operating said drivers in accordance with the decoded signals derived from said counter to provide random or sequential patterns of illumination of said lamps in said matrix to display a predetermined training pattern for students observing the indicia pattern thus generated, the selected inoperative lamps being part of the pattern.

4. In a teaching aid system:

means for recording selectively digital signals on a recording medium;

a digital signal generator;

a matrix of manually operable switching elements connected with said recording means so that selection of particular switching elements in said matrix can be made manually to record particular digital signals from said generator on said recording means;

a playback means associated with said recording means for playing back the recording medium for receiving said digital signals recorded thereon;

a playback decoding matrix including switch elements and a digital input means responsive to said digital signals from said playback means and adapted to actuate said switch elements in response to the decoding of said playback signals; and a display array including lamps and associated indicia arrayed to be illuminated by said lamps, said lamps being connected with said switch elements so as to be illuminated selectively in accordance with said decoded signals, whereby a program of materials to be learned can be recorded on said recording means by the manual operation of said switching elements of said matrix and reproduced on playback on said display array.

* * * * *